United States Patent [19]

Venolia et al.

[11] Patent Number: 5,313,230
[45] Date of Patent: May 17, 1994

[54] THREE DEGREE OF FREEDOM GRAPHIC OBJECT CONTROLLER

[75] Inventors: Daniel S. Venolia, Foster City; Shinpei Ishikawa, Cupertino, both of Calif.

[73] Assignee: Apple Computer, Inc., Cupertino, Calif.

[21] Appl. No.: 918,956

[22] Filed: Jul. 24, 1992

[51] Int. Cl.$^5$ .............................................. G09G 5/00
[52] U.S. Cl. ..................................... 345/163; 345/157; 200/11 TW
[58] Field of Search ................... 340/706, 709, 710; 74/471 XY, 491; 345/156, 157, 163, 164, 167; 200/11 TW, 9; 341/20, 22

[56] References Cited

U.S. PATENT DOCUMENTS

| | | | |
|---|---|---|---|
| 3,350,956 | 7/1965 | Monge | 74/471 X |
| 4,555,960 | 12/1985 | King | 74/491 |
| 4,562,347 | 12/1985 | Hovey et al. | 250/221 |
| 4,692,756 | 9/1987 | Clark | 340/709 |
| 4,721,308 | 1/1988 | Trimble | 340/706 |
| 4,766,423 | 8/1988 | Ono et al. | 340/709 |
| 4,808,979 | 2/1989 | DeHoff et al. | 340/709 |
| 4,812,829 | 3/1989 | Ebina et al. | 340/709 |
| 4,835,528 | 5/1989 | Flinchbaugh | 340/709 |
| 4,933,670 | 6/1990 | Wislocki | 340/710 |
| 4,961,138 | 10/1990 | Gorniak | 340/710 |
| 4,982,618 | 1/1991 | Culver | 340/710 |
| 4,987,527 | 1/1991 | Hanada et al. | 364/167.01 |
| 5,095,302 | 3/1992 | McLean et al. | 340/710 |
| 5,095,303 | 3/1992 | Clark et al. | 340/709 |
| 5,132,672 | 7/1992 | Clark | 340/709 |
| 5,175,534 | 12/1992 | Thatcher | 340/709 |
| 5,181,181 | 1/1993 | Glynn | 340/710 |

OTHER PUBLICATIONS

IBM Technical Disclosure Bulletin, vol. 21, No. 7, Dec. 1978, New York U.S., pp. 3026, 3027, N. Leon, "Thumbwheel Positional Control Unit."
Computer Graphics, vol. 15, No. 3, Aug. 1981, pp. 91-97, Evans, et al., "Tablet-Based Valuators That Provide One, Two, Or Three Degrees Of Freedom."

*Primary Examiner*—Alvin E. Oberley
*Assistant Examiner*—Steve Saras
*Attorney, Agent, or Firm*—V. Randall Gard

[57] ABSTRACT

A three degrees of freedom interactive display controller device is disclosed, comprising a hand manipulable housing unit having an opening for the passage of a mouse ball, two motion detectors for detecting the movement of the mouse ball and converting that motion to output signals controlling the translational movement of an object on the display of a computer and at least one finger operated wheel or roller for controlling the translational motion of the object with respect to a third translational axis. All translation controls are operable to be physically moved in a direction which corresponds to the desired simulated direction of movement of the object on the display. The physical motion of each control is unbounded and the actual physical position of the housing unit is independent of the simulated position of the object on the display.

13 Claims, 4 Drawing Sheets

THREE DEGREE OF FREEDOM GRAPHIC OBJECT CONTROLLER

FIELD OF THE INVENTION

The present invention relates generally to control devices for manipulating the position of objects on the display of a computer system, and more particularly to an improved control device for manipulating such objects in at least three degrees of freedom.

BACKGROUND OF THE INVENTION

Many computers, when equipped with sufficient memory and appropriate software, are capable of generating images of three dimensional objects. Displaying such objects, however, is only of relative usefulness if the position and orientation of the displayed objects cannot be readily controlled by the user. Although a prior art two-dimensional control device, such as a mouse, trackball or stylus, allows a user to control simple two dimensional movements of a three dimensional object, such a device generally does not allow the user to control movement of the object in a third degree of freedom, so as to simulate translational three dimensional movement, or in other degrees of freedom, so as to simulate complex three dimensional manipulations, such as yaw, pitch and roll.

To allow standard control devices to be used to control the movement of a three dimensional object relative to a third degree of freedom, standard control devices have been used in conjunction with keyboard commands or other physically input commands (such as additional buttons on a mouse or trackball) requiring the use of a second hand (or particularly nimble fingers) by the user to control object translation along a third axis. For example, two dimensional mouse controllers, which control motion relative to an X and Y axis, can be used in combination with the up and down arrow control keys on a keyboard to control translational movement of the object relative to the Z-axis. Further, two dimensional trackball controllers, which control motion relative to an X and Y axis, can be used in combination with a rotational or twisting motion of the trackball (or surrounding housing member) to control translational movement of the object relative to the Z-axis. These techniques for manipulating a three dimensional object are generally unsatisfactory for the replication of natural-like control of the object because they require the user to devote two hands (or, again, to have particularly nimble fingers) to carrying out the manipulations (one to move the mouse and one to push the keyboard buttons). Hence, the object's motion along the third axis is generally difficult to control and coordinate, particularly without affecting the other axes.

Trackballs and mice have also been modified to allow the user to simultaneously control movement of an object with respect to three translational axes. Evans, Tanner and Wein, "Tablet-Based Valuators that Provide One, Two, or Three Degrees of Freedom", *Computer Graphics*, Volume 15, Number 3, August 1981, page 91, describes a tablet-based three-axis trackball which emulates a standard two-axis trackball and includes a third sensor so that rotation can be simultaneously detected about each of three orthogonal axes. The trackball detects motion about the X-axis by rolling the ball up and down, the Y-axis by rolling the ball sideways, and the Z-axis by twisting the ball clockwise or counter-clockwise. However, because all axes are simultaneously controlled by a single physical element (the ball), independent control of the object with respect to a single axis, without affecting the other axes, is generally difficult to control and coordinate.

Control devices, however, have been created which provide some degree of independent control over the movement of three dimensional objects in relation to three axes and/or control over the rotation of such objects (yaw, pitch and roll) relative to those axes. One such device is a virtual controller, which uses a standard control device in conjunction with special software to remap the standard two dimensional motion of the control device to a different type of motion. For example, a virtual controller could be designed to take signals generated by the control device when making an in and out motion and to remap those signals to cause the object to change its yaw rotation. One problem with this type of device is that the user must set and/or change the desired mapping before taking and/or changing actions to create the desired effect. Another problem with this type of device is that the effect of a desired user action may often be difficult for the user to conceptualize, thereby making use of the device both awkward and unfriendly.

A second type of prior art controller, having a joystick or stick-shift type handgrip, is shown in Monge, U.S. Pat. No. 3,350,956, and King, U.S. Pat. No. 4,555,960. These references disclose a type of controller having four basic limitations which make its use as an input controller and object manipulator difficult. First, the device is bounded, meaning that the physical construction of the device limits the distance the handgrip can be moved in any one direction, thereby limiting the distance the object can likewise be moved. This limitation is undesirable because, in some computing simulations, it may be preferable to move the object in one particular direction for a longer period of time, or over a greater distance, than allowed by the boundaries of the device. Second, because all axes of motion are controlled by a single handgrip, it is difficult to move the object with respect to any one particular axis without also causing changes with respect to the other axes. Third, because the device is physically bounded, the position output signal of the device, which controls the position and orientation of the object, must be absolutely related to the physical position of the handgrip, which again limits the unbounded motion of the object. Fourth, because the handgrip of the device is controlled by movement of the user's entire arm or arms, precise control of the device, and therefore the object, may be difficult and in some situations fatiguing.

A third type of control device involves the use of a spherically shaped control or ball mounted on the end of a stick or suspended in the center of a weighted base. This type of device controls the position and orientation of the object on the screen by detecting very small changes in the orientation of the sphere along with the degree of force exerted on the sphere by the user. Since a continual force in one direction can be translated as a continual movement, this type of device resolves the bounding problem of the joystick device, but does nothing to eliminate interdependence of the position output signal on the physical movement of the controller, nor does it remove the likelihood of user arm fatigue.

A fourth type of device involves the use of a box with three or more rotating knobs corresponding to each type of movement to be controlled. Although this device resolves problems with bounding and interdependence, the direction of physical motion for all axes is rotary and therefore does not match the simulated motion of the object. In addition, the user must use two hands to simultaneously control more than one axis. Further, because the user has only two hands, it is not possible for a single user to control object manipulation in three axes simultaneously. Thus, the multiple knob box is both awkward and lacks intuitiveness.

A fifth type of device, such as the 3SPACE Isotrak controller by the Polhemus Navigation Sciences Division of McDonnell Douglas Electronics Company, Colchester, Vt., uses a stationary source for generating a low-frequency magnetic field to a sensor which monitors changes in the magnetic field caused by the sensor's own movement. The sensor is small and can be mounted on or within a wide variety of nonmetallic devices, such as a stylus or sphere, which can then be manipulated by the user in free-space to control the movement of an object on an associated computer's display. Because this type of device requires the user to hold the sensor in the air within the magnetic field while in use, it is heavily dependent on the agility and stamina of the user's arm to maintain control over the object's position and orientation. In addition, this type of device is bounded because it will only operate within the magnetic field of the source. The position output signal of such a device is, like a number of the other prior art devices, interdependent on the actual physical position of the sensor. Finally, because the device emits radio waves, it cannot be operated around large metallic objects, such as desks or filing cabinets, or other electronic devices which could adversely affect the received magnetic field.

SUMMARY AND OBJECTS OF THE INVENTION

An objective of the present invention is to provide an improved controller device for manipulating displayed objects in at least three degrees of freedom.

The foregoing and other advantages are provided by an apparatus for providing signals indicative of an object's location on a display, comprising a housing operative to be manipulated by a user, a first translation position indicating means affixed to said housing for producing a first signal indicative of a first position of said object on said display with respect to a first translational axis, a second translation position indicating means affixed to said housing for producing a second signal indicative of a second position of said object on said display with respect to a second translational axis, and a third translation position indicating means affixed to said housing, said third translation position indicating means comprising at least two separately operable rotatably coupled bidirectional finger wheels, for producing a third signal indicative of a third position of said object on said display with respect to a third translational axis, whereby a movement of said device over a surface results in said first and second positions of said object being defined on said display, and whereby a movement of said finger wheels results in said third position of said object being defined on said display.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

Referring now to FIGS. 1, 2, 3 and 4, there is illustrated a hand controller, shown generally as 10, in accordance with the preferred embodiment of the present invention. The controller 10, having a main housing 12, operates to control the position and orientation of a computer generated image or object (not shown) on the display of a computer (not shown). The image is manipulated (moved or modified) by the controller 10 with respect to two orthogonal translational axes in a manner which is similar to the operation of a standard object control device, such as a mouse, the operation of which is well known in the art. The position of the object with respect to those two axes is controlled by the movement of a mouse ball 14, which is suspended within the housing 12 in a manner which is well known in the art, so that the user can freely roll ball 14 over flat generally horizontal surfaces. The height of a Teflon ®-like slider 15 (illustrated in FIG. 4). attached to the bottom of housing 12, approximately corresponds to the drop of mouse ball 14 so that controller 10 remains in a level position over the horizontal surface upon which it is moved.

Figure 1:
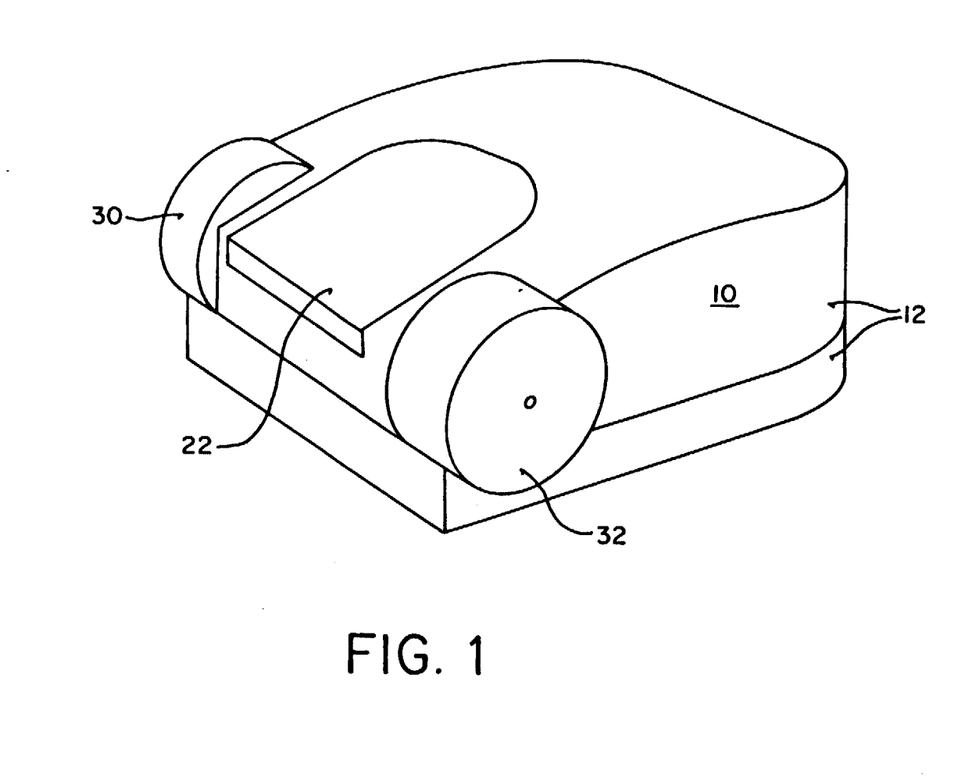
FIG. 1 is a perspective view of a preferred embodiment of the controller device of the present invention.
Figure 2:
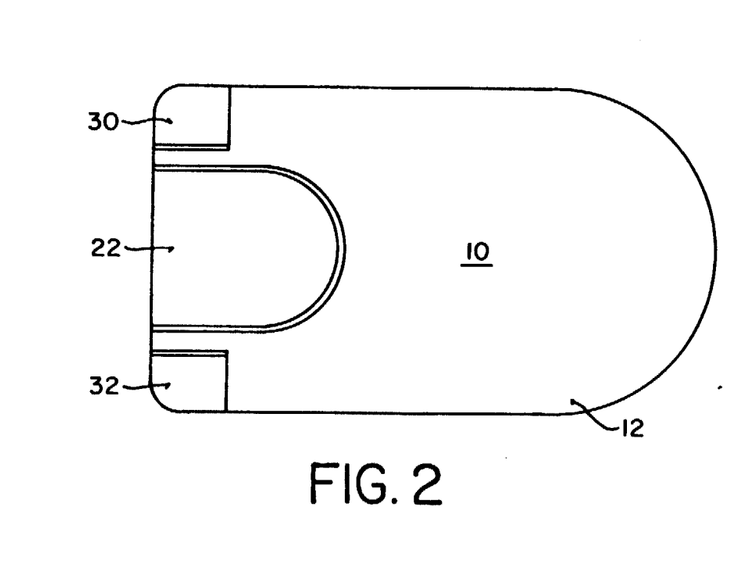
FIG. 2 is a top plan view of the controller device of FIG. 1.
Figure 3:
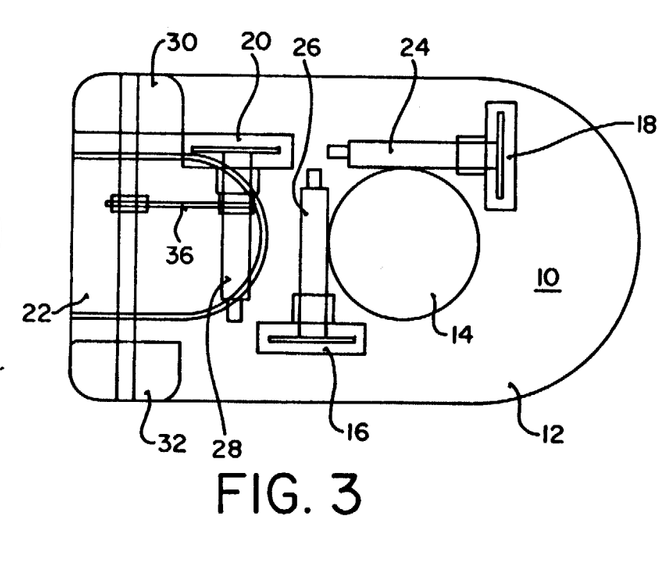
FIG. 3 is a partially broken top plan view of the controller device of FIGS. 1 and 2.
Figure 4:
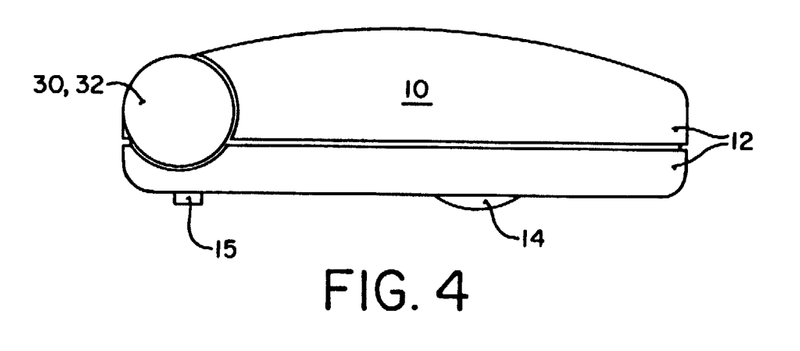
FIG. 4 is a side elevational view of the controller device of FIGS. 1, 2 and 3.

As is well known in the art of the present invention, within housing 12 are two encoder/detector mechanisms, a Y-axis encoder/detector shown generally as 16 for detecting "up" and "down" user directed motions of the controller 10, and an X-axis encoder/detector shown generally as 18 for detecting "right" and "left" user directed motions of the controller 10. The Y-axis encoder/detector 16 is coupled to a ball contact shaft 26 for driving encoder/detector 16 in response to movements of ball 14. Encoder/detector 16, generally comprised of LED's and phototransistors, senses the movement of ball 14 through rotation of encoder/detector 16 and outputs a quadrature signal to the computer through a wiring harness (not shown). This quadrature signal corresponds to changes in the translational position of the housing 12 and ball 14 and is used by the computer to control the simulated or displayed position of the object with respect to the Y-axis (up/down) of the display.

Note that encoder/detector 16 and 18 could also be comprised of electromagnetic or optical devices or any of a number of other types of motion detectors and/or decoders well known in the art of the present invention. So as to not unnecessarily obscure the present invention, some electrical components and wiring has not been shown. Note that it would also be possible to provide the controller with its own resident power source and to transmit data signals from the controller 10 to the computer using wireless transmission technology, such as through means of infrared transmission.

Referring now back to FIG. 3, the X-axis encoder/detector 18 is coupled to a ball contact shaft 24 for driving encoder/detector 18. Encoder/detector 18 senses the movements of ball 14 through rotation of encoder/detector 18 and outputs a quadrature signal to the computer (not shown). This quadrature signal corresponds to changes in the translational position of the housing 12 and ball 14 and is used by the computer to control the simulated or displayed position of the object with respect to the X-axis (left/right) of the display. An appropriate support member (not shown) may be used to apply pressure against ball 14 to keep it in contact with ball contact shafts 24 and 26, as is well known in the art.

Another standard feature of the controller of the present invention is the selection mechanism 22, which is comprised of one or more selection buttons or switches. The selection mechanism 22 allows the user to perform particular actions through use of the controller, such as selecting and dragging objects across the display screen of the computer, in a manner which is well understood by persons of ordinary skill in the art.

With the present invention, a finger wheel mechanism is utilized to control the "in" and "out" translations of the displayed object with respect to a third translational axis, the Z-axis. The finger wheel mechanism in the preferred embodiment of the present invention is comprised of a left finger wheel 32 and a right finger wheel 30 each axially mounted on opposing ends of a wheel shaft 34. Exposed surfaces of finger wheels 30 and 32 allow the user to place a finger on either or both wheels 30 and 32 in order to rotate them. The surface of finger wheels 30, 32 could also be knurled, or otherwise roughened, or finger wheels 30, 32 could be made of an appropriately tacky material, so that the user's fingers can readily engage finger wheels 30, 32 without the user's finger slipping across their surface. Rotating finger wheels 30, 32 rotates wheel shaft 34 thereby driving a belt 36. Belt 36 in turn drives or rotates a third encoder/detector 20. The rotational motion of encoder/detector 20 is measured and converted to a quadrature signal in a manner similar to that of encoder/detectors 16 and 18. This quadrature signal corresponds to changes in the translational position of finger wheels 30, 32 and is used by the computer to control the simulated or displayed position of the object with respect to a Z-axis of the display.

A controller having three translational axis encoder/detectors similar to those described above would be effective for controlling a computer generated object with respect to at least three degrees of freedom. As stated above, two of the translational axes would be controlled in the familiar manner of a standard mouse controller. Further, in the present invention, the third degree of freedom or translational would be controlled by the delicate motions of the user's finger on thumb wheels 30, 32, thereby allowing the user to simultaneously or independently control each of the three axes of translation with a single hand and/or make object selection via selection means 22.

It should be noted that the physical construction of controller 10 makes it possible to directly map the physical motion of controller 10 with respect to each of the translational axes (up/down, left/right, and in/out) to the simulated motion of the object. For example, if a user desires to move the object to the left, the user simply moves the controller 10 to the left, and if the user desires to move the object up, the user simply moves the controller forward. Furthermore, if the user desires to move the object into or out of the display (in or out of the plane in which the object is being displayed), the user simply rotates finger wheels 30, 32 towards or away from the leading edge of controller 10. Hence, the user can easily conceptualize the simulated effect that each type of physical motion by the user, with respect to controller 10 or one of its associated control mechanisms, will have on the position of the object on the display. In addition, the physical construction of controller 10 resolves problems regarding physical bounding and interdependence between the actual position of controller 10 and the simulated position of the object on the display.

Note that the design of the preferred embodiment of the present invention comprises separating finger wheel 30 from finger wheel 32 by selection mechanism 22. Separating finger wheels 30, 32 by selection means 22 allows for truly independent operation of finger wheels 30, 32 from selection means 22 thus avoiding inadvertent operation of finger wheels 30, 32 when operating selection means 22, and vice-versa.

Furthermore, as was explained above, the design of the preferred embodiment of the present invention comprises axially mounting finger wheels 30, 32 on opposing ends of wheel shaft 34. In this way, operation of either finger wheel 30, 32 simultaneously operates the other finger wheel 30, 32 and in the same rotational direction. As such, the controller design of the preferred embodiment of the present invention provides for true ambidextrous operation whereby controller 10 may be operated with either the user's left hand or right hand with equal ease and with identical operational results and kinesthetic feedback between controller operation and object display manipulation.

Note that in addition to the three dimensional control of the position of the object on the display made possible by the present invention, additional degrees of freedom can likewise be controlled, thereby enhancing the user's ability to control both the object's position and orientation on the display. Additional degrees of freedom can be controlled by selecting via software the particular degree of freedom affected by any given encoder/detector of controller 10.

Although the user's conceptualization of the effect of certain physical movements may be enhanced by the previously described physical construction of the controller 10 and its control mechanisms, such as thumb wheels 30, 32, that physical construction is only preferable and is not a specific requirement of the present invention. Other constructions, such as that of the alternative embodiment depicted in FIGS. 5, 6 and 7, and in FIGS. 8, 9 and 10 and in FIG. 11, could likewise be utilized in accordance with the present invention.

Figure 5:
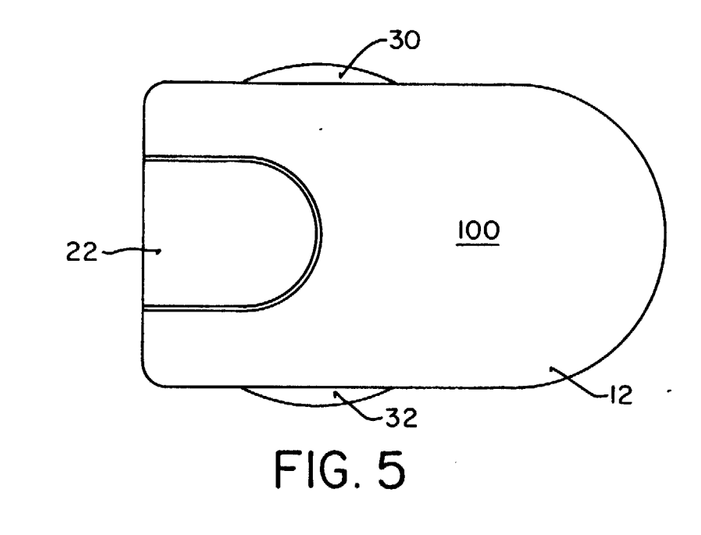
FIG. 5 is a top plan view of an alternative embodiment of the controller device of FIG. 1.
Figure 6:
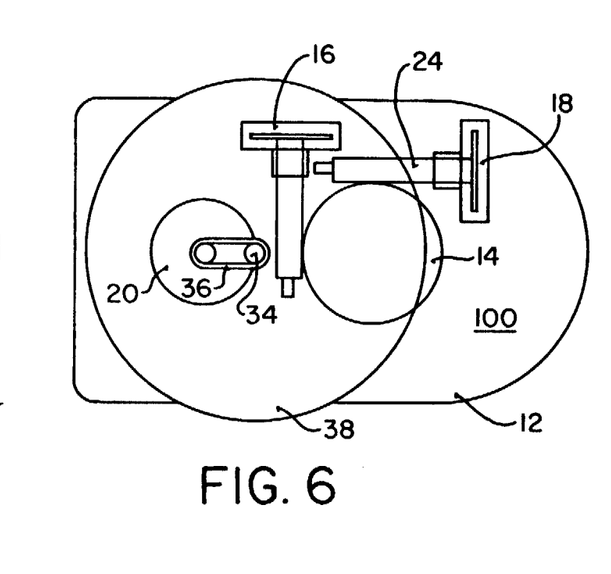
FIG. 6 is a partially broken top plan view of the controller device of FIG. 5.
Figure 7:
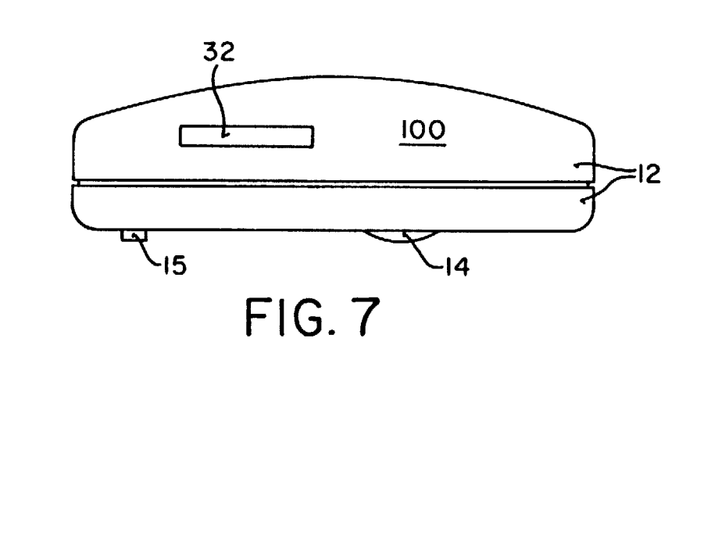
FIG. 7 is a side elevational view of the controller device of FIGS. 5 and 6.

An alternative embodiment controller 100, depicted in FIGS. 5, 6 and 7, although physically configured differently, is equipped in basically the same manner as controller 10 of FIGS. 1, 2, 3 and 4, i.e., with a mouse ball 14 and translational encoder/detectors 16 and 18. Controller 100, as well as controller 10, could also be equipped with electromagnetic or optical encoder/detectors, instead of ball 14 and encoder/detectors 16 and 18, to detect the translational position of the controller with respect to the X and Y-axes (such techniques are well known in the art).

Alternative embodiment controller 100 further comprises a finger wheel mechanism to control the "in" and "out" translations of the displayed object with respect to a third translational axis, the Z-axis. The finger wheel mechanism of controller 100 is comprised of finger wheel 38 mounted on finger wheel axle 34. Exposed surfaces of finger wheel 38 allow the user to place a finger on either side of controller 100 and rotate finger wheel 38. The surface of finger wheel 38 could also be knurled, or otherwise roughened, or finger wheel 38 could be made of an appropriately tacky material, so that the user's fingers can readily engage finger wheel 38 without the user's finger slipping across its surface. Rotating finger wheel 38 rotates wheel axle 34 thereby driving a belt 36. Belt 36 in turn drives or rotates a third encoder/detector 20. Note that other translational coupling means such as gears and the like, as is well known in the art, may be used in lieu of belt 36. The rotational motion of encoder/detector 20 is measured and converted to a quadrature signal in a manner similar to that of encoder/detectors 16 and 18. This quadrature signal corresponds to changes in the translational position of finger wheel 38 and is used by the computer to control the simulated or displayed position of the object with respect to a Z-axis of the display.

Figure 8:
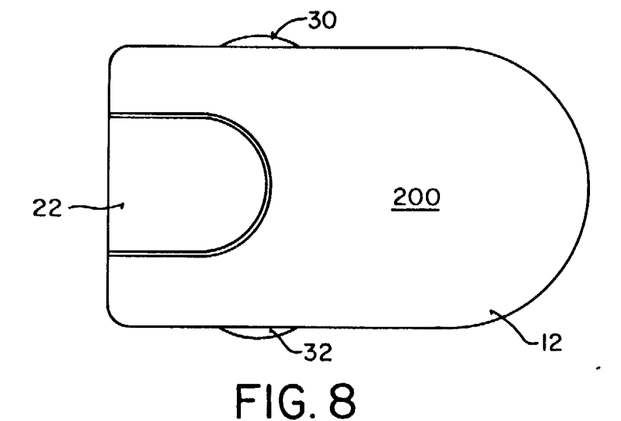
FIG. 8 is a top plan view of a further alternative embodiment of the controller device of FIG. 1.
Figure 9:
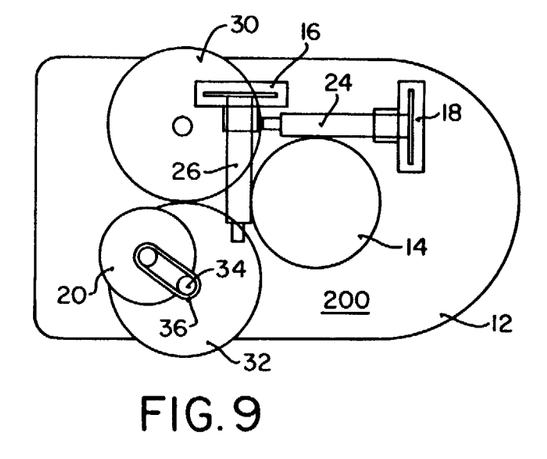
FIG. 9 is a partially broken top plan view of the controller device of FIG. 8.
Figure 10:
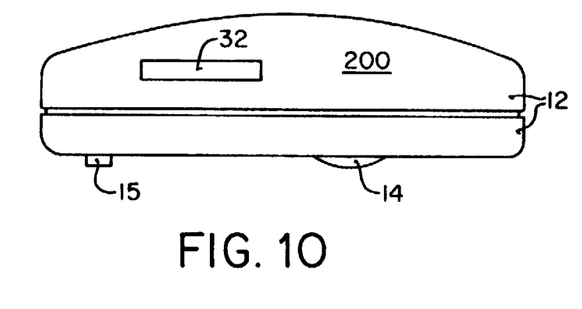
FIG. 10 is a side elevational view of the controller device of FIGS. 8 and 9.

A further alternative embodiment controller 200, depicted in FIGS. 8, 9 and 10, although physically configured differently, is equipped in basically the same manner as controller 10 of FIGS. 1, 2, 3 and 4, i.e., with a mouse ball 14 and translational encoder/detectors 16 and 18. Controller 200, as well as controller 10, could also be equipped with electromagnetic or optical encoder/detectors, instead of ball 14 and encoder/detectors 16 and 18, to detect the translational position of the controller with respect to the X and Y-axes (such techniques are well known in the art).

Alternative embodiment controller 200 further comprises a finger wheel mechanism to control the "in" and "out" translations of the displayed object with respect to a third translational axis, the Z-axis. The finger wheel mechanism of controller 200 is comprised of left finger wheel 32 axially mounted on a finger wheel axle 34 and right finger wheel 30 axially mounted on a separate finger wheel axle 44. Finger wheel 30 and finger wheel 32 are tangentially aligned and coupled so that when either finger wheel 30, 32 is rotated the other finger wheel 30, 32 also rotates, albeit in an opposite rotational direction. Exposed surfaces of finger wheels, 30, 32 allow the user to place a finger on either side of controller 200 and rotate finger wheels 30, 32. The surface of finger wheels 30, 32 could also be knurled, or otherwise roughened, or finger wheels 30, 32 could be made of an appropriately tacky material, so that the user's fingers can readily engage finger wheels 30, 32 without the user's finger slipping across their surface. Rotating finger wheels 30, 32 rotates wheel axle 34 thereby driving a belt 36. Belt 36 in turn drives or rotates a third encoder/detector 20. Note that other translational coupling means such as gears and the like, as is well known in the art, may be used in lieu of belt 36. The rotational motion of encoder/detector 20 is measured and converted to a quadrature signal in a manner similar to that of encoder/detectors 16 and 18. This quadrature signal corresponds to changes in the translational position of finger wheels 30, 32 and is used by the computer to control the simulated or displayed position of the object with respect to a Z-axis of the display.

Figure 11:
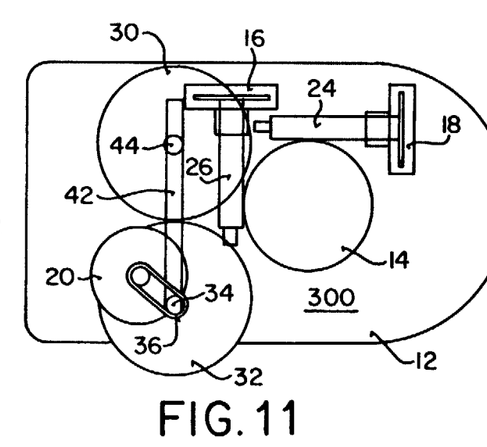
FIG. 11 is a partially broken top plan view an alternative embodiment of the controller device of FIGS. 8, 9 and 10.

A still further alternative embodiment controller 300, depicted in FIG. 11, although physically configured differently, is equipped in basically the same manner as controller 200 of FIGS. 8, 9 and 10 and, hence, controller 10 of FIGS. 1, 2, 3 and 4. The finger wheel mechanism of controller 300 is mounted in a track or guide 42 which allows sliding or shifting of the entire finger wheel mechanism left or right within controller 300. When the finger wheel mechanism of controller 300 is shifted left in track 42, left finger wheel 32 protrudes out from the side of controller 300 and the right finger wheel 30 is retracted within controller 300. Likewise, when the finger wheel mechanism of controller 300 is shifted right in track 42, left finger wheel 32 is retracted within controller 300 and right finger wheel 30 protrudes out from the side of controller 300.

In this way, when the user wishes to use controller 300 in such a way where the thumb of the user's right hand is intended to operate the finger wheel mechanism, then the user need merely ensure that the finger wheel mechanism is shifted left in track 42. And when the user wishes to use controller 300 in such a way where the fingers (other than the thumb) of the user's right hand are intended to operate the finger wheel mechanism, then the user need merely ensure that the finger wheel mechanism is shifted right in track 42. Still further, when the user wishes to use controller 300 in such a way where the thumb of the user's left hand is intended to operate the finger wheel mechanism, then the user need merely ensure that the finger wheel mechanism is shifted right in track 42. And when the user wishes to use controller 300 in such a way where the fingers (other than the thumb) of the user's left hand are intended to operate the finger wheel mechanism, then the user need merely ensure that the finger wheel mechanisum is shifted left in track 42.

Thus, controller 300 of the present invention also provides true ambidextrous operation while eliminating any possibility of the user's other fingers hindering the movement of one finger wheel 30, 32 when one of the user's fingers is operating the other finger wheel 30, 32. Of course, track 42 must be designed so that inadvertent shifting of the finger wheel mechanism does not occur, particularly during finger wheel 30, 32 operation. This inadvertent shifting could be avoided by ensuring adequate resistance between track 42 and axles 34, 44, yet still ensuring adequate finger wheel 30, 32 rotation. This inadvertent shifting could also be avoided by providing detents or stops within track 42, as is well known in the art, so that shifting the finger wheel mechanism is limited to a clean, positive action.

Note that an alternative design to track or guide 42 of controller 300 could be a triangular configuration wherein axle 34 of finger wheel 32 would be located at a first corner of the triangular configuration, axle 44 of finger wheel 34 would be located at a second corner of the triangular configuration and third encoder/detector 20 would be located at a third corner of the triangular configuration. Further, by allowing the entire triangular configuration, including finger wheels 30, 32 to selectively pivot about the third corner of the triangular configuration which contains the third encoder/detector 20 configuration, not only could either finger wheel 30, 32 be selected to be the 'protruding' finger wheel, but, in addition, the distance or relationship between axle 34 of finger wheel 32 (or, alternatively, axle 44 of finger wheel 30) and the third encoder/detector 20 remains constant thus allowing a fixed placement of the third encoder/detector 20 within controller 300.

As was stated above with reference to FIGS. 8, 9, 10 and 11, alternative embodiment controllers 200 and 300 (as did preferred embodiment controller 10 of FIGS. 1, 2, 3 and 4) provide for true ambidextrous operation. Because rotation of either finger wheel 30, 32 causes rotation of the other finger wheel 30, 32, but in the opposite rotational direction, controllers 200 and 300 (as did controller 10) may be operated with either the user's left hand or right hand with equal ease and with identical operational results and kinesthetic feedback between controller operation and object display manipulation. For example, if a user operated controller 200 (or controller 300 or controller 10) with a right hand and rotated left finger wheel 32 in a backward rotational direction so as to cause the displayed object to move out of the display (out of the plane in which the object is being displayed), the same operational results would occur if the user operated controller 200 (or controller 300 or controller 10) with a left hand and rotated right finger wheel 30 in a similar backward rotational direction. Note that this ambidextrous operation is facilitated by the rotational coupling of thumb wheels 30, 32 where the finger wheels of controller 10 of FIGS. 1, 2, 3 and 4 are axially aligned thus causing movement in the same rotational direction and where the finger wheels 30, 32 of controller 200 and controller 300 of FIGS. 8, 9, 10 and 11 are tangentially aligned thus causing movement in the opposite rotational direction.

It should be further noted that all of the above controllers, or other types of controllers constructed in a manner consistent with the above descriptions, are still unbounded devices because each of the degrees of freedom may be ratcheted by the user. For example, to repeatedly move the object "out" with respect to the Z-axis, the user simply strokes across the finger wheel a number of times, thereby causing an encoder to rotate in the appropriate direction and generate an output signal to the computer corresponding to those movements.

Although the present invention has been described with reference to FIGS. 1-4 with emphasis on a preferred embodiment and FIGS. 5-11 with respect to alternative embodiments, it should be understood that the figures are for illustration only and should not be taken as limitations upon the invention. It is contemplated that many changes and modifications may be made to the present invention by one of ordinary skill in the art, after having read the above description, without departing from the spirit and scope of the invention as disclosed above.

What is claimed is:

1. A device for providing signals indicative of an object's location on a display, comprising:
   a housing operative to be manipulated by a user;
   a first translation position indicating means affixed to said housing for producing a first signal indicative of a first position of said object on said display with respect to a first translational axis;
   a second translation position indicating means affixed to said housing for producing a second signal indicative of a second position of said object on said display with respect to a second translational axis; and
   a third translation position indicating means affixed to said housing, said third translation position indicating means comprising at least two separately operable rotatably coupled bidirectional finger wheels, for producing a third signal indicative of a third position of said object on said display with respect to a third translational axis;
   whereby a movement of said device over a surface results in said first and second positions of said object being defined on said display, and whereby a movement of said finger wheels results in said third position of said object being defined on said display.

2. The device as recited in claim 1, wherein said finger wheels are axially aligned.

3. The device as recited in claim 2, wherein said finger wheels are separated by a selection means.

4. The device as recited in claim 1, wherein said finger wheels are tangentially aligned.

5. The device as recited in claim 4, wherein said tangentially aligned finger wheels are translatable within said housing as a single unit.

6. The device as recited in claim 1, wherein the bidirectional movement of said finger wheels is unbounded.

7. The device as recited in claim 1, wherein said bidirectional finger wheels are affixed to said housing in such a manner that the physical direction of motion of said finger wheels substantially corresponds to the direction of motion of said object with respect to said third translational axis.

8. The device as recited in claim 7, wherein said third translation position indicating means further comprises:
   a belt operative to be bidirectionally moved by rotation of said finger wheels; and
   means for detecting the bidirectional movement of said belt and converting the detected movement of said belt to said third signal.

9. An apparatus for generating signals indicative of the three-dimensional position of an object, comprising:
   an external housing;
   a first translation position indicating means mounted to said housing for producing a first signal indicative of a first position of said object with respect to a first axis;
   a second translation position indicating means mounted to said housing for producing a second signal indicative of a second position of said object with respect to a second axis; and
   a third translation position indicating means mounted to said housing, said third translation position indicating means comprising at least two bidirectional finger wheels, for producing a third signal indicative of a third position of said object with respect to a third axis;
   whereby movement of said apparatus over a surface results in said first and second positions of said object being defined, and whereby movement of any of said bidirectional finger wheels results in said third position of said object being defined.

10. The apparatus as recited in claim 9, wherein said finger wheels are translatable within said housing as a single unit.

11. The apparatus as recited in claim 9, wherein the bidirectional movement of said finger wheels are unbounded.

12. The apparatus as recited in claim 11, wherein said bidirectional finger wheels are affixed to said housing in such a manner that the physical direction of motion of said finger wheels substantially corresponds to the direction of motion of said object with respect to said third translation axis.

13. The apparatus as recited in claim 12, wherein said third translation position indicating means further comprises:
a belt operative to be bidirectionally moved by rotation of said finger wheels; and
means for detecting the bidirectional movement of said belt and converting the detected movement of said belt to said third signal.

* * * * *

UNITED STATES PATENT AND TRADEMARK OFFICE
CERTIFICATE OF CORRECTION

PATENT NO. : 5,313,230
DATED : May 17, 1994
INVENTOR(S) : Daniel S. Venolia and Shinpei Ishikawa It is certified that error appears in the above-indentified patent and that said Letters Patent is hereby corrected as shown below:

Title page item [75],

Change the spelling of the second inventor's name to "Shinpei Ichikawa".

Signed and Sealed this

Tenth Day of December, 1996

Attest:

BRUCE LEHMAN

Attesting Officer

Commissioner of Patents and Trademarks